(12) United States Patent
Demirdogen et al.

(10) Patent No.: US 7,341,536 B2
(45) Date of Patent: Mar. 11, 2008

(54) LIGHT WEIGHT DIFFERENTIAL CASE HALF

(75) Inventors: Caner Demirdogen, Kalamazoo, MI (US); James Ridge, Portage, MI (US); James F. Ziech, Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 211 days.

(21) Appl. No.: 11/254,575

(22) Filed: Oct. 20, 2005

(65) Prior Publication Data

US 2007/0093348 A1 Apr. 26, 2007

(51) Int. Cl.
*F16H 48/06* (2006.01)
*F16H 57/04* (2006.01)
*F16H 57/02* (2006.01)

(52) U.S. Cl. ............... 475/230; 475/160; 74/606 R

(58) Field of Classification Search ........... 475/160, 475/220, 230, 231; 74/606 R, 607, 467
See application file for complete search history.

(56) References Cited

U.S. PATENT DOCUMENTS

| | | | |
|---|---|---|---|
| 1,097,843 A | 5/1914 | Brown | |
| 1,658,571 A | 2/1928 | Ormsby | |
| 4,455,889 A | 6/1984 | Hauser | |
| 4,959,043 A * | 9/1990 | Klotz et al. | 475/230 |
| 5,562,561 A * | 10/1996 | Gillard | 475/231 |
| 5,857,936 A | 1/1999 | Ishikawa | |
| 5,897,453 A * | 4/1999 | Mimura | 475/246 |
| 5,989,147 A | 11/1999 | Forrest et al. | |
| 6,014,915 A | 1/2000 | Evans | |
| 6,061,907 A | 5/2000 | Victoria | |
| 6,413,183 B1 | 7/2002 | Ishikawa et al. | |
| 7,232,399 B2 * | 6/2007 | Valente | 475/252 |
| 2005/0137047 A1 * | 6/2005 | Hay | 475/220 |

FOREIGN PATENT DOCUMENTS

WO  WO 00/23731  4/2000

\* cited by examiner

*Primary Examiner*—Roger Pang
(74) *Attorney, Agent, or Firm*—Marshall & Melhorn LLC

(57) ABSTRACT

A vehicle differential case is disclosed, the case having an interior and an exterior configuration which provides an increased internal volume for, among other things, lubricant for components of the differential mechanism, while at the same time providing excellent structural strength. Importantly, the weight versus stiffness ratio of the differential case so described is significantly improved compared to known differential cases.

18 Claims, 6 Drawing Sheets

LIGHT WEIGHT DIFFERENTIAL CASE HALF

BACKGROUND OF THE INVENTION

The present invention relates to a case half for a differential which is reduced in weight from known devices while having improved structural integrity, and increased internal capacity for lubricant in order to better lubricate the differential components located inside the case.

FIGS. 5 and 6 herein illustrate a prior art differential case which is commonly owned by the assignee of the present application. As will be readily apparent to those skilled in the art, the prior art differential case has a limited internal lubricant capacity by virtue of smaller lubricant reservoirs, and the greater wall thickness of the prior art case contributes to its greater weight.

SUMMARY OF THE INVENTION

The present invention relates to a differential case comprising an output shaft hub for mounting a differential bearing, and a flange having a plurality of fastener apertures for mounting a ring gear. In between the output shaft hub and the flange is a portion having an inner and outer surface. At least the inner surface of the portion between the output shaft hub and the flange has a plurality of depressions which alternate with an equal number of substantially hollow ribs. Each depression connects an internal spider support and a pinion thrust surface to a segmented side gear internal thrust surface, and the like number of substantially hollow ribs form one or more lubricant reservoirs.

BRIEF DESCRIPTION OF THE DRAWINGS

The structure and operation of the invention, together with further advantages thereof, may best be understood by reference to the accompanying drawings and the following descriptions.

DETAILED DESCRIPTION OF THE INVENTION

Figure 1:
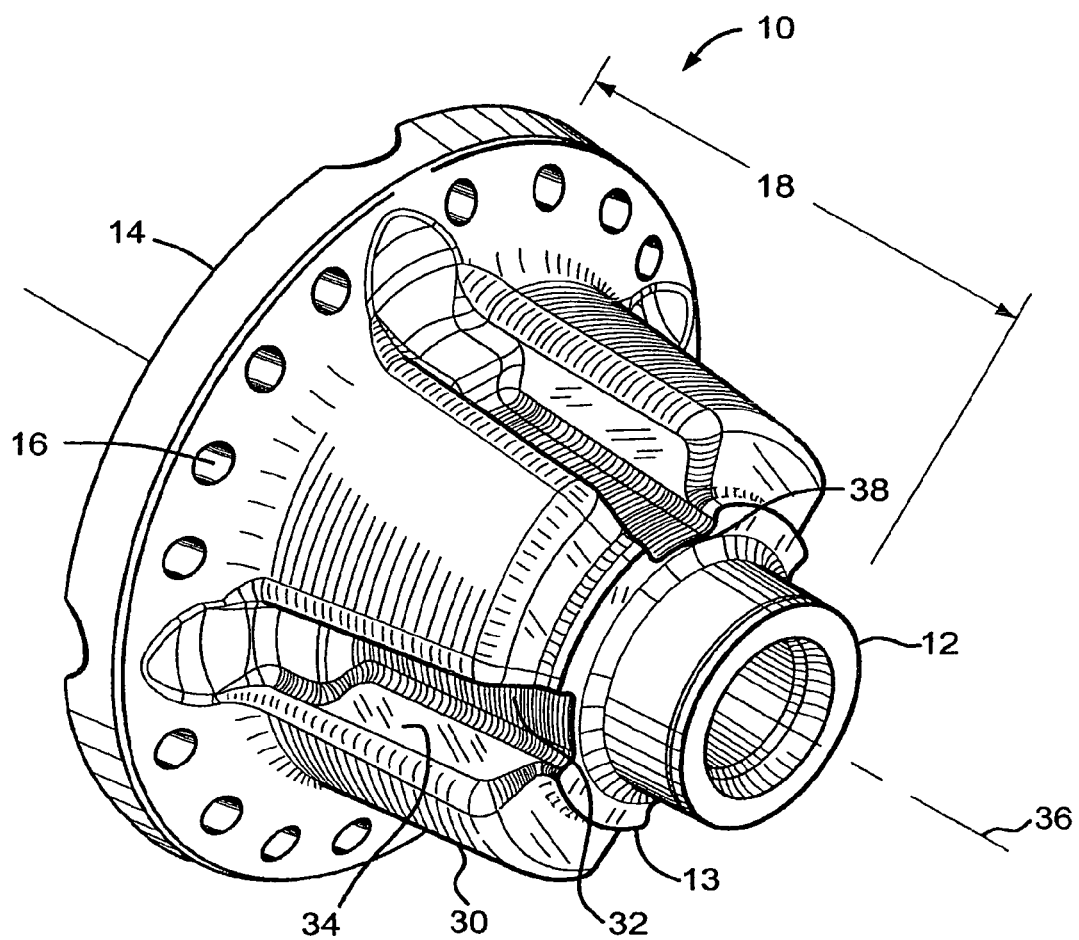
FIG. 1 is a perspective view of the configuration of the outer surface of the differential case.

While the invention may be susceptible to different embodiments, there is shown in the drawings and the following detailed discussion, a preferred embodiment with the understanding that this present disclosure is to be considered an exemplification of the principles of the invention and is not intended to limit the invention to that as illustrated and described herein.

The present invention is primarily concerned with a lightweight differential case 10. The case houses a differential mechanism which forms a portion of a vehicle drivetrain, such as a truck drivetrain.

The subject differential case 10 affords a number of advantages, besides lighter weight, over conventional differential cases. For example, the novel configuration of the differential case provides an increased interior volume, a portion of which volume is available to contain additional lubricant, thus improving the lubrication of the differential gears and other components housed in the subject differential case 10. Preferably, the internal volume of the differential case which is available for gearing and lubricant is approximately 40% of the total exterior volume of the differential case 10 where the total exterior volume is defined as the volume enclosed by a revolved surface that is the projected side view external envelope of the differential case.

Figure 2:
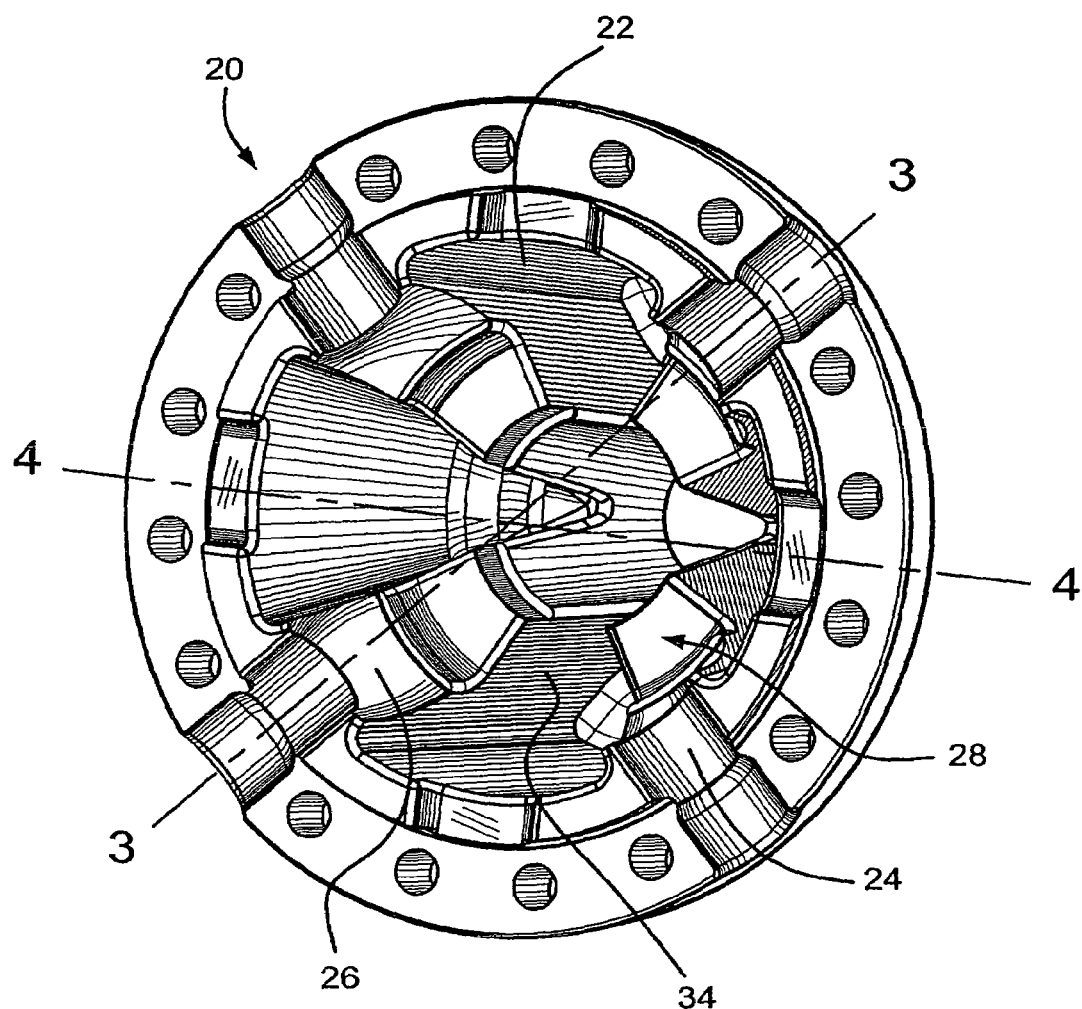
FIG. 2 is a perspective view of the configuration of the inner surface and interior volume of the differential case.

Such advantages are accomplished by a differential case 10 generally having a configuration defined by: an output shaft hub 12 at one extremity, a flange 14, having a plurality of fastener apertures 16 therein at the other extremity, and therebetween, a differential case body portion 18. As best seen in FIG. 2, the inner surface of the differential case body portion 18 is defined by a plurality of depressions 20 which alternate with an equal number of substantially hollow ribs 22. Each such internal depression 20 forms an internal spider arm support 24 and a pinion thrust surface 26, which pinion thrust surface 26 is connected to a segmented side gear internal thrust surface 28. Additionally, each rib 22 may form a lubricant reservoir.

Figure 3:
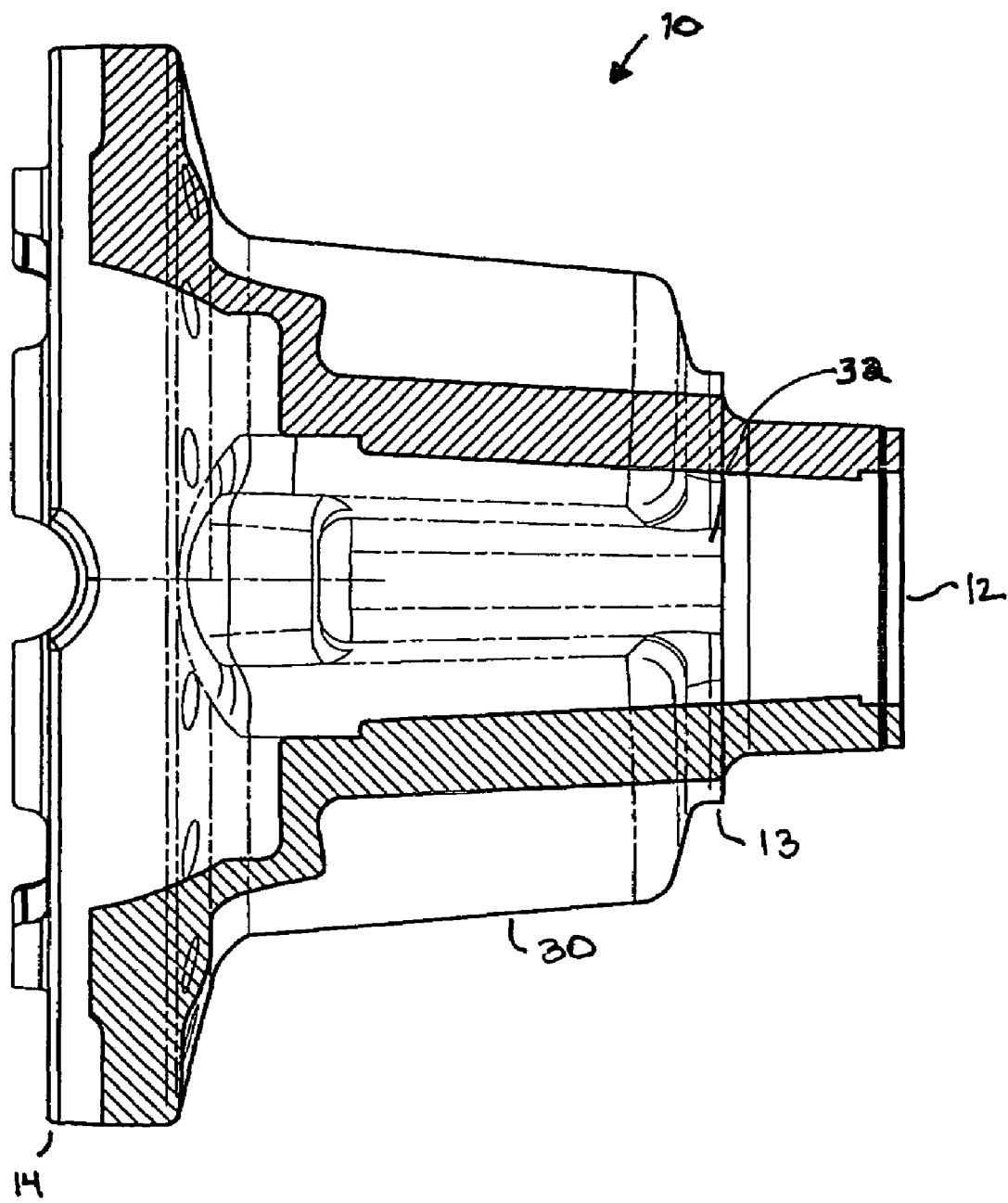
FIG. 3 is a cross sectional view of the differential case taken along lines 3-3 of FIG. 2.
Figure 4:
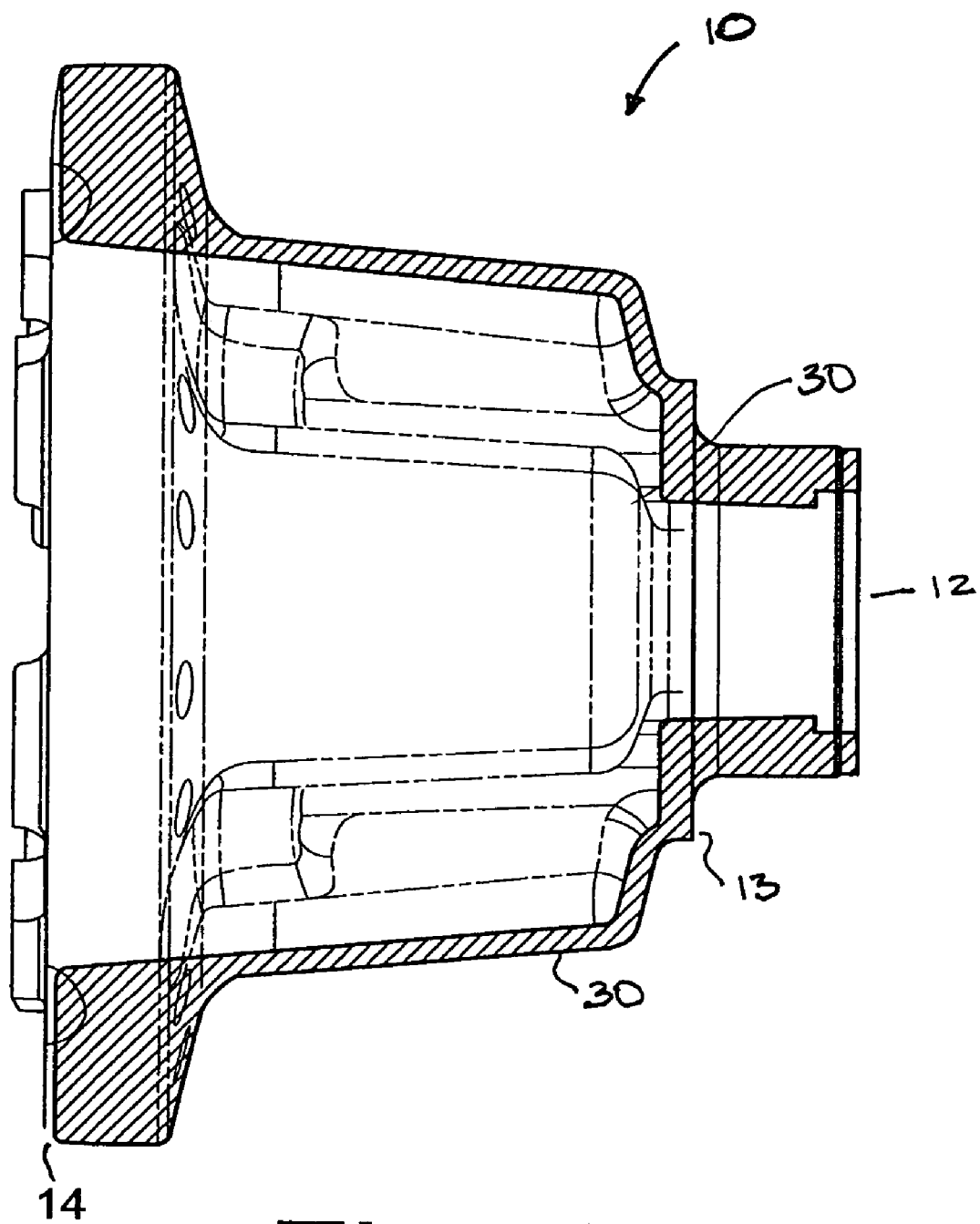
FIG. 4 is a cross section view of the differential case taken along lines 4-4 of FIG. 2.

As best seen in FIG. 1, the configuration of the external surface of the differential case body portion 18 is largely defined by the interior structure just described. Consequently, the external surface of the differential case body 18 comprises a plurality of raised portions 30 defined by the internal ribs 22 alternating with an equal number of non-raised portions 32 defined by the internal depressions 20, as best seen in FIGS. 3 and 4. As will be noted in FIG. 1, the alternating raised portions 30 and non-raised portions 32 of the outer surface extend, substantially, the length of the body portion 18 of the differential case 10 between the output shaft hub 12 more specifically, the output shaft hub bearing shoulder 13, and the flange 14. Similarly, as shown in FIG. 2, the alternating hollow ribs 22 and depressions 20 internal to the differential case 10 extend, substantially, the length of the body portion 18 of the differential case 10.

With continuing reference to FIG. 2, four internal surface depressions 20 and a like number of alternating substantially hollow ribs 22 are shown. It is, however, within the scope of the invention for the number of internal surface depressions 20 and substantially hollow ribs 22 to also be two or three in number.

Similarly, as illustrated in FIG. 1, there are four raised portions 30 and four non-raised portions 32 shown on the exterior of the differential case body portion 18. When there are either two or three internal surface depressions 20 and an equal number of substantially hollow ribs 22, there will likewise be two or three raised portions 30 and non-raised portions 32 comprising the exterior configuration of the differential case body portion 18.

As light weight is an objective of the present invention, the type of material utilized to form the differential case 10, the method by which the case is formed, and the amount of material contained in the differential case 10 must all be considered.

With regard to material, the differential case 10 may be produced from any suitable material, for example, steel, iron, aluminum, and composite material, such as carbon fiber and resin.

Where the material of the differential case 10 is a metal, the case may be forged or cast. The configuration of the differential case 10 of the present invention allows forging or casting, without a need for substantial post-production machining. By way of example, only 20-50% of the side gear thrust surface area, out of the full 360° annular surface area of the interior surface area of the present differential case 10 requires postproduction machining. Minimal machining results in a substantial cost savings in the manufacturing process.

The use of modern casting and forging techniques, in turn, allows precise control over the wall thickness of the subject differential case 10. Variations of no more than ±50% from the average wall thickness of the case are necessary to produce the present differential case 10. This may be contrasted to conventional differential cases, where such variation may be ±75% from average wall thickness, in addition to an average that is thicker than the present invention.

The subject differential case 10 may be said to have surface draft, by which term is meant, the taper of the inner and other surfaces of a part to be cast or forged utilizing a two-piece mold, such that the part will readily release from the mold when the casting or forging process is complete.

Figure 5:
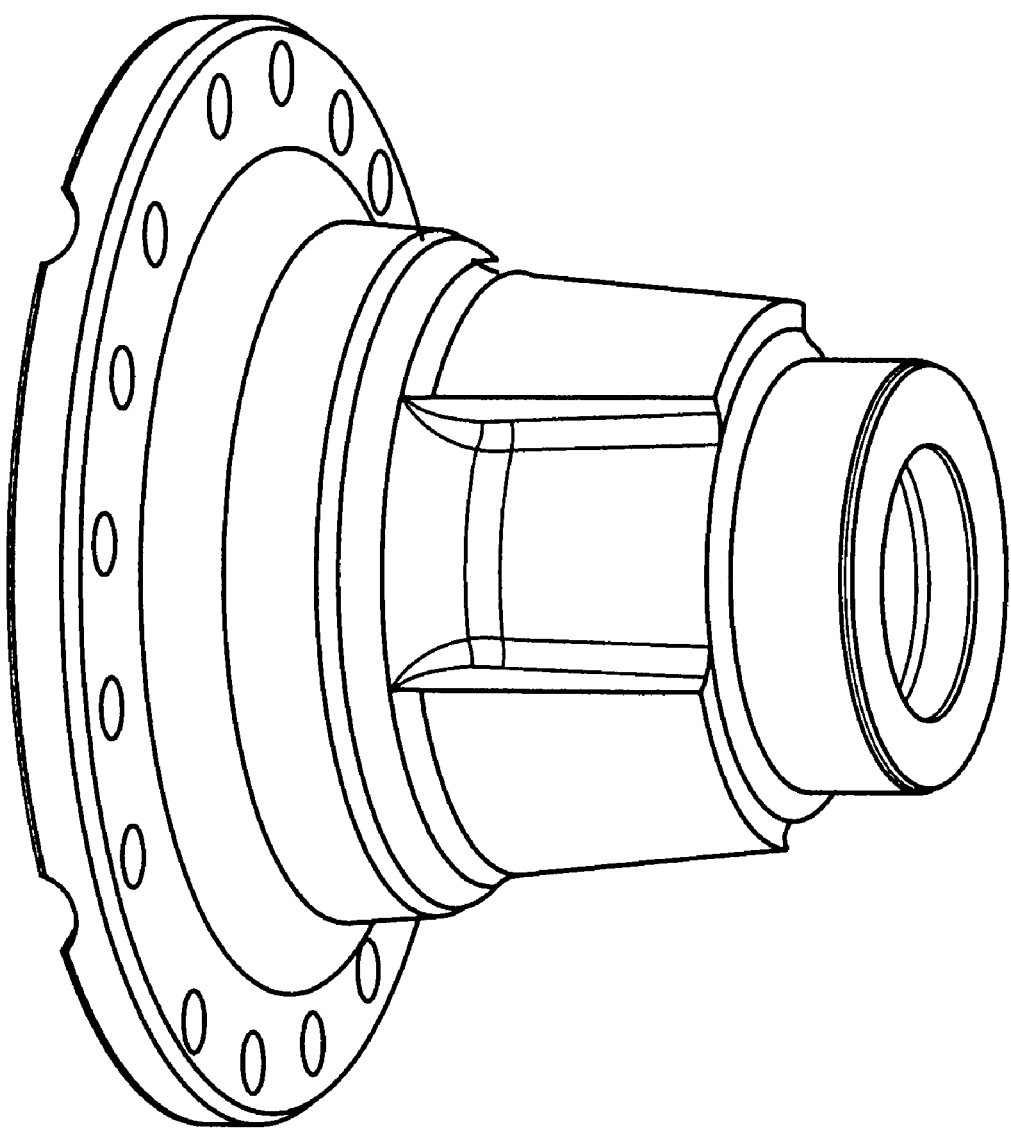
FIG. 5 is a perspective view of the configuration of the outer surface of a prior art differential case.
Figure 6:
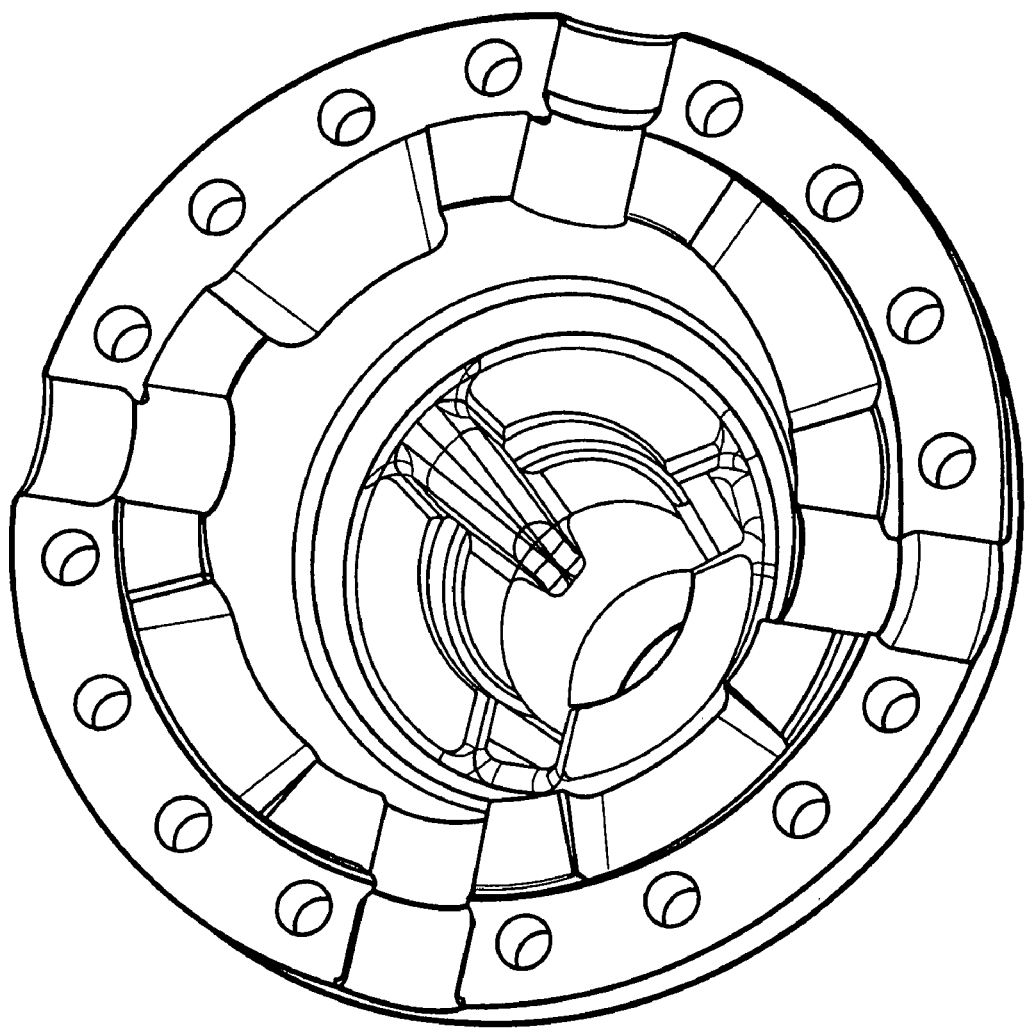
FIG. 6 is a perspective view of the configuration of the inner surface of the prior art differential case of FIG. 5.

The subject differential case 10, despite its lighter weight is still stronger than conventional differential cases such as is shown in FIGS. 5 and 6. In part, this improved strength is believed to be attributable to the configuration of the differential case body portion 18 whereby the raised portions 30 and non-raised portions 32 are connected by vertical radially outwardly extending walls 34, shown in FIGS. 1 and 2, which are orthogonal to a central axis 36. As previously noted, this configuration is also reflected in the interior structure of the differential case body portion 18. As used herein "central axis" means an imaginary line extending through the center of the opening forming the output shaft hub 12 along the length of the body of the differential case 18 and through the center of the opening formed by the flange 14.

A further advantage of the present differential case 10 is that the external depressions 20 formed by the internal hollow ribs 22 provide a means for output shaft hub 12 bearing puller access 38, which is often not provided on conventional differential cases.

As best seen in FIG. 2, four differential spider arm supports 24 are shown as formed in the interior surface of the mounting flange 14. In accordance with the present invention, the number of spider arm supports 24 is equal to the number of substantially hollow ribs 22 which alternate with a like number of depressions 20 to, substantially, form the interior volume of the differential case 10. As previously described, it is within the scope of the present invention for the number of hollow ribs 22, and thus, the number of spider arm supports 24 in the mounting flange 14 to number two, three, or four.

While a preferred embodiment of the present invention is shown and described, it is envisioned that those skilled in the art may devise various modifications of the present invention without departing from its spirit and scope.

What is claimed is:

1. A differential case, comprising:
   an output shaft hub;
   a flange having a plurality of fastener apertures; and
   a portion between the output shaft hub and the flange having an inner surface and an outer surface, wherein at least the inner surface has a plurality of depressions which alternate with an equal number of substantially hollow ribs and wherein each depression forms an internal spider arm support and a pinion thrust surface connected to a segmented side gear internal thrust surface and wherein the ribs form one or more lubricant reservoirs.

2. The differential case defined in claim 1, wherein each hollow rib and internal depression extends from said output shaft hub to the flange of the differential case, thereby providing surface draft to the exterior and the interior of the differential case.

3. The differential case defined in claim 1, wherein the outer surface comprises a plurality of raised portions defined by the internal ribs alternating with an equal number of non-raised portions defined by the internal depressions.

4. The differential case defined in claim 3, wherein the alternating raised portions and non-raised portions extend substantially the length of the portion of the differential case between the output shaft hub and the flange.

5. The differential case defined in claim 3, wherein the raised portions and non-raised portions are connected by vertical radially outward walls substantially orthogonal to a central axis.

6. The differential case defined in claim 1, wherein the number of internal surface depressions and the number of interior, alternating substantially hollow ribs may be four, three, or two.

7. The differential case defined in claim 3, wherein the number of raised portions, and the number of non-raised portions may be four, three, or two.

8. The differential case defined claim 1, wherein the material of the differential case comprises one chosen from the group consisting of steel, composite material, iron and aluminum.

9. The differential case defined in claim 8, wherein the case is forged.

10. The differential case defined in claim 8, wherein the case is cast.

11. The differential case of claim 1, wherein said depressions and said hollow ribs having a substantially uniform wall thickness which varies a maximum of ±50% from an average wall thickness, between said flange and said output shaft hub.

12. The differential case defined in claim 1, wherein each of the substantially hollow ribs extends substantially the length of the portion of the differential case between the output shaft hub and the flange.

13. The differential case defined in claim 12, wherein the internal volume for gearing and fluid capacity including the substantially hollow ribs is approximately 40% of the total exterior volume of the differential case.

14. The differential case defined in claim 12, wherein the space between the said hollow ribs forms an external depression that is used for output shaft hub bearing puller access and the substantially hollow ribs terminate at a segmented output shaft hub bearing shoulder.

15. The differential case defined in claim 8, wherein the percentage of the side gear thrust surface area of the inner surface requiring machining is from approximately 20% to approximately 50% of a full 360° annular surface.

16. The differential case defined in claim 15, wherein the percentage of side gear thrust face exposed directly to the lubricant reservoir is 50% or more of a full 360° annular surface.

17. A differential case comprising:
   an output shaft hub;
   a mounting flange having at least a portion of one or more spider supports defined therein; and a portion between said output shaft hub and said flange defining an inner volume and an outer volume, wherein a predetermined portion of the inner volume comprises alternating depressions and substantially hollow ribs, the hollow ribs providing a predetermined number of reservoirs for lubricant, the number of reservoirs being equal to the number of spider supports in the flange;

wherein at least a portion of each depression comprises in order, proceeding from the flange toward the output shaft hub and in linear alignment, the spider support, a pinion thrust surface, and a segmented side gear internal thrust surface.

18. The differential case defined in claim 17, wherein the number of spider supports and the number of lubricant reservoirs is two, three or four.

* * * * *